(12) United States Patent
Shinohara et al.

(10) Patent No.: US 10,429,942 B2
(45) Date of Patent: Oct. 1, 2019

(54) GESTURE INPUT DEVICE

(71) Applicant: OMRON Corporation, Kyoto (JP)

(72) Inventors: Masayuki Shinohara, Kyoto (JP); Yasuhiro Tanoue, Shiga (JP); Norikazu Kitamura, Osaka (JP); Gouo Kurata, Hyogo (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 15/985,399

(22) Filed: May 21, 2018

(65) Prior Publication Data

US 2018/0373341 A1 Dec. 27, 2018

(30) Foreign Application Priority Data

Jun. 22, 2017 (JP) .................................. 2017-122604

(51) Int. Cl.
*G06F 3/01* (2006.01)
*F21V 8/00* (2006.01)
*G06F 3/042* (2006.01)

(52) U.S. Cl.
CPC ............ *G06F 3/017* (2013.01); *G02B 6/0011* (2013.01); *G06F 3/0425* (2013.01)

(58) Field of Classification Search
CPC ...... G06F 3/017; G06F 3/0425; G02B 6/0011
See application file for complete search history.

(56) References Cited

U.S. PATENT DOCUMENTS

| | | | | |
|---|---|---|---|---|
| 2011/0115823 A1* | 5/2011 | Huebner | ................ | G03B 21/14 345/661 |
| 2011/0291990 A1* | 12/2011 | Kiyose | .................. | G06F 3/0418 345/175 |
| 2013/0241826 A1* | 9/2013 | El Dokor | ................ | G06F 3/011 345/156 |
| 2016/0349850 A1 | 12/2016 | Tsuda | | |

FOREIGN PATENT DOCUMENTS

JP         2015-184841 A      10/2015

* cited by examiner

*Primary Examiner* — Abhishek Sarma
(74) *Attorney, Agent, or Firm* — Osha Liang LLP

(57) ABSTRACT

An input device includes: a movement detector that detects a user movement; and an image projector that forms a zone image in a space to present a region where the movement detector detects movement; and the image projector includes a first light source; and a first light guide plate which includes a light emitting surface and directs light entering from the first light source so that the light exits from the light emitting surface and forms an image in a space.

4 Claims, 22 Drawing Sheets

GESTURE INPUT DEVICE

FIELD

The present invention relates to a gesture input device that allows input via user movement.

BACKGROUND

Japanese Patent Publication No. 2015-184841 (published 22 Oct. 2015) discloses a gesture input device that detects a specific part of a user's body (e.g., the user's finger) and performs an operation on a vehicle instrument on the basis of the movement of said specific part. The movement of the above mentioned specific part can be detected, for instance, via a near-infrared sensor that produces a three-dimensional image. The near-infrared sensor has a predetermined region that is the detection area and detects the movement of the finger when the user's finger enters the detection area.

However, the user may unable to provide suitable input to the gesture input device disclosed in JP 2015-184841 A since the user is unable to recognize the detection area of the gesture input device.

Embodiments of the present invention implement a gesture input device that allows the user to recognize the area accepting an input action.

SUMMARY

To address the foregoing a gesture input device according to an embodiment of the present invention includes: a movement detector configured to detect a user movement; and an image projector configured to form a zone image in a space to present a region whereat the movement detector is configured to detect movement. The image projector includes a light source; and a light guide plate which includes a light emitting surface and is configured to direct light entering from the light source so that the light exits from the light emitting surface and forms an image in a space.

In the above-described configuration, the image projector forms a zone image in a space to present a region whereat the movement detector is configured to detect movement. The light source and the light guide plate are in the image projector, and light entering from the light source is directed by the light guide plate to exit from the light emitting surface and form an image in a space. Accordingly, the user can recognize where the input device accepts input actions via presentation of an input location image formed in a space, and appropriately perform an input action.

The gesture input device according to another embodiment further includes a determination unit configured to assess whether or not the movement detected by the movement detector is an input action representing a predetermined input; and an assessment result presentation unit configured to present an assessment result from the determination unit.

With the above-described configuration the determination unit assesses the movement detected by the movement detector, and the assessment result presentation unit presents the assessment result. Accordingly, a user may reference the assessment result to verify whether the input action was assessed as the desired input.

The assessment result presentation unit in a gesture input device according to another embodiment includes a second light guide plate configured to direct light entering from the plurality of second light sources so that the light exits therefrom and forms an image in a space.

In the above-described configuration, the assessment result from the determination unit is presented as an image formed in a space via the second light source and the second light guide plate.

In a gesture input device according to another embodiment, the light guide plate and the second light guide plate are stacked.

The above-described configuration reduces the size of the gesture input device.

The assessment result presentation unit in a gesture input device according to another embodiment may include: a plurality of second light sources; and a second light guide plate configured to direct light entering from the plurality of second light sources so that the light exits therefrom and forms an image in a space; and when the movement detected by the movement detector is an input action representing a predetermined input, the assessment result presentation unit activates a second light source among the plurality of second light sources corresponding to said input action to cause a different image corresponding to the input action to be formed in a space.

According to the above-described configuration, different images may be formed in a space by switching to a second light source in response to the input action and causing that light to enter the second light guide plate.

In a gesture input device according to another embodiment, the direction from which light is incident on the second light guide plate is the different for the plurality of second light sources.

According to the above-described configuration, different images may be formed in space by causing light to enter from different directions.

In a gesture input device according to another embodiment, the direction from which light is incident on the second light guide plate is the same for the plurality of second light sources and the second light sources are mutually isolated.

According to the above-described configuration, different images may be formed in space by causing light to enter from different locations.

EFFECTS

A gesture input device according to embodiments of the present invention allows a user to recognize the area accepting an input action.

DETAILED DESCRIPTION

First Embodiment

An input device 1 (gesture input device), which is an embodiment of the present invention is described below in detail.

Configuration of the Input Device 1

Figure 1:
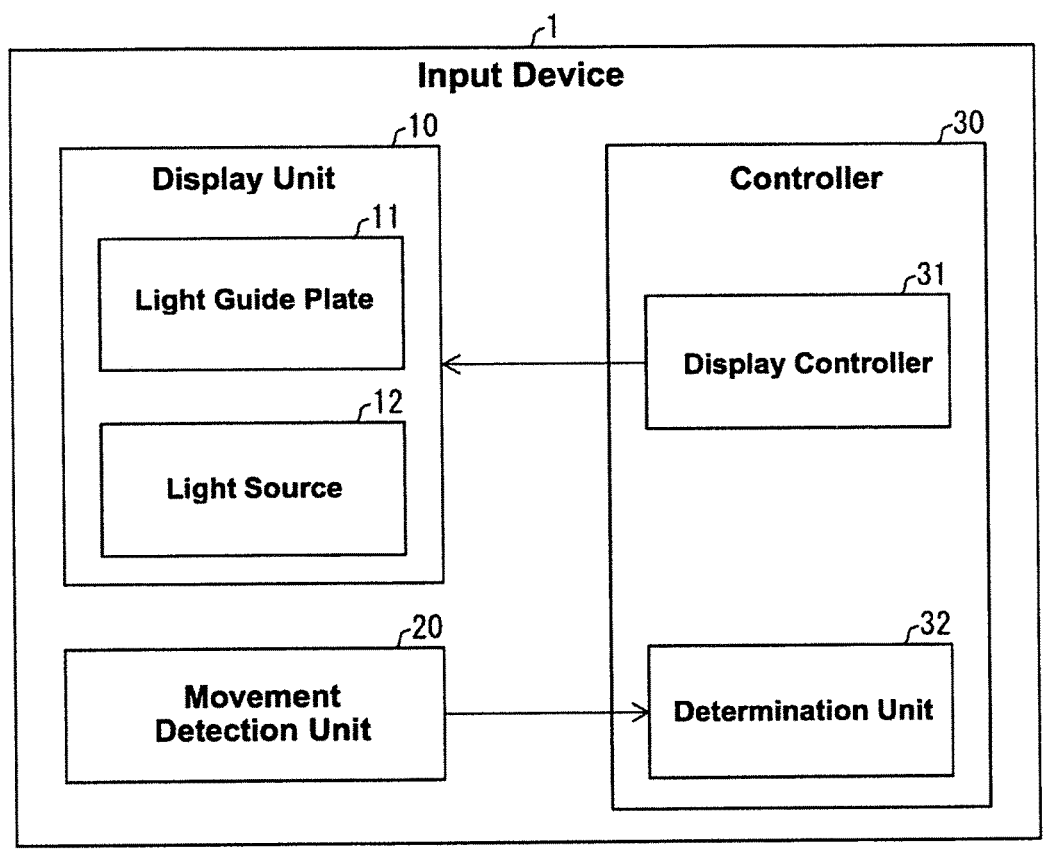
FIG. 1 is a block diagram illustrating the main components of an input device according to a first embodiment of the present invention.

FIG. 1 is a block diagram illustrating the main components of an input device 1 according to a first embodiment; as illustrated in FIG. 1, the input device 1 is provided with a display unit 10, a movement detector 20, and a controller 30. The display unit 10 includes a light guide plate 11 (i.e., a first light guide plate) and a light source 12 (i.e., a first light source). The controller 30 includes a display controller 31 and a determination unit 32.

The display unit 10 (i.e., an image projector) forms an input location image (i.e., a zone image) in a space to present the region in which the movement detector 20 is configured to detect movement. A specific configuration of the display unit 10 is described below.

Figure 2:
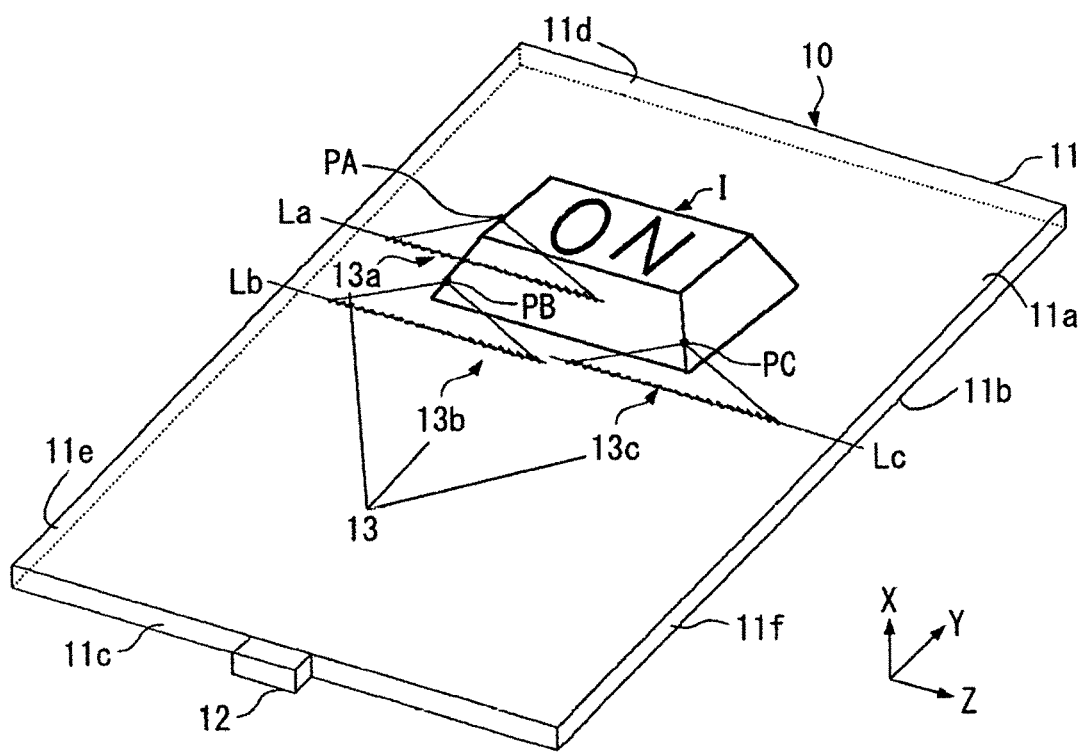
FIG. 2 is a perspective view of a display unit provided to the above-mentioned input device.

FIG. 2 is a perspective view of the display unit 10. FIG. 2 illustrates a state where the display unit 10 presents a stereoscopic image I; more specifically the display unit 10 displays a button-shaped stereoscopic image I along with the letters "ON".

The light guide plate 11 is a transparent rectangular resin material with a relatively high refractive index. The light guide plate 11 may be produced from, for instance, a polycarbonate resin, a poly methyl methacrylate resin, glass or the like. The light guide plate 11 is provided with an emission surface 11a (i.e., a light emitting surface) that outputs light, a rear surface 11b opposing the emission surface 11a, and four end surfaces 11c, 11d, 11e, 11f. The end surface 11c is an incidence surface wherethrough light projected from the light source 12 enters the light guide plate 11. The end surface 11d opposes the end surface 11c; and the end surface 11e opposes the end surface 11f; light entering the light guide plate 11 from the light source 12 is directed by the light guide plate 11 to exit from the emission surface 11a and produce an image in a space. The light source 12 may be a light emitting diode, for example.

A plurality of optical-path changing portions 13 are formed on the rear surface 11b of the light guide plate 11 including an optical-path changing portion 13a, an optical-path changing portion 13b, and an optical-path changing portion 13c. The optical-path changing portions 13a, 13b, and 13c are formed along the lines La, Lb, and Lc respectively. Here the lines La, Lb, and Lc are straight lines that are substantially parallel to the Z axis direction. Any given optical-path changing portion 13 is formed sequentially for the most part along the Z axis direction. In other words, the plurality of optical-path changing portions 13 is formed along predetermined lines in a plane parallel to the emission surface 11a.

Light projected from the light source 12 and directed by the light guide plate 11 is incident at each position of the optical-path changing portions 13 along the Z axis direction. The optical-path changing portions 13 cause light incident at each location thereof to substantially converge at a fixed point corresponding to the optical-path changing portion 13. The optical-path changing portions 13a, 13b, and 13c in particular are illustrated in FIG. 2 as a portion of the optical-path changing portions 13. FIG. 2 further illustrates the optical-path changing portions 13a, 13b, and 13c in a state where the plurality of light beams exiting therefrom converge.

More specifically, the optical-path changing portion 13a corresponds to a fixed point PA in the stereoscopic image I. Light exiting from each location of the optical-path changing portion 13a converges at the fixed point PA. Therefore, the optical wavefront from the optical-path changing portion 13a appears as an optical wavefront that is radiating from the fixed point PA. The optical-path changing portion 13b corresponds to a fixed point PB in the stereoscopic image I. Light exiting from each position of the optical-path changing portion 13b converges at the fixed point PB. Thus, any of the optical-path changing portions 13 cause light incident at each location thereof to substantially converge at a corresponding fixed point. Thus, any of the optical-path changing portions 13 may present an optical wavefront that appears to radiate from a corresponding fixed point. The optical-path changing portions 13 correspond to mutually different fixed points. The grouping of a plurality of fixed points corresponding to the optical-path changing portions 13 produces a stereoscopic image I in a space which can be perceived by a user. More specifically, the stereoscopic image I is produced in a space near the emission surface 11a in relation to the light guide plate 11.

The display controller 31 controls the presentation of the input location image shown by the display unit 10. For example, the display controller 31 controls activating and deactivating the light source 12 provided to the display unit 10 to thereby control presenting or hiding the input location image. Additionally, the display controller 31 may adjust the brightness when the light source 12 includes a function for controlling the brightness thereof.

The movement detector 20 detects the movements of the user. The movement detector 20 may be an imaging device that employs, for example, a charge-coupled device (CCD) or a complementary metal oxide semiconductor (CMOS). In addition, the movement detector 20 may be a near-infrared sensor.

The determination unit 32 assesses whether or not the user movement detected by the movement detector 20 is an input action representing a predetermined input. An input action is a preliminarily determined movement established in the input device 1 as a movement representing an input.

Figure 3:
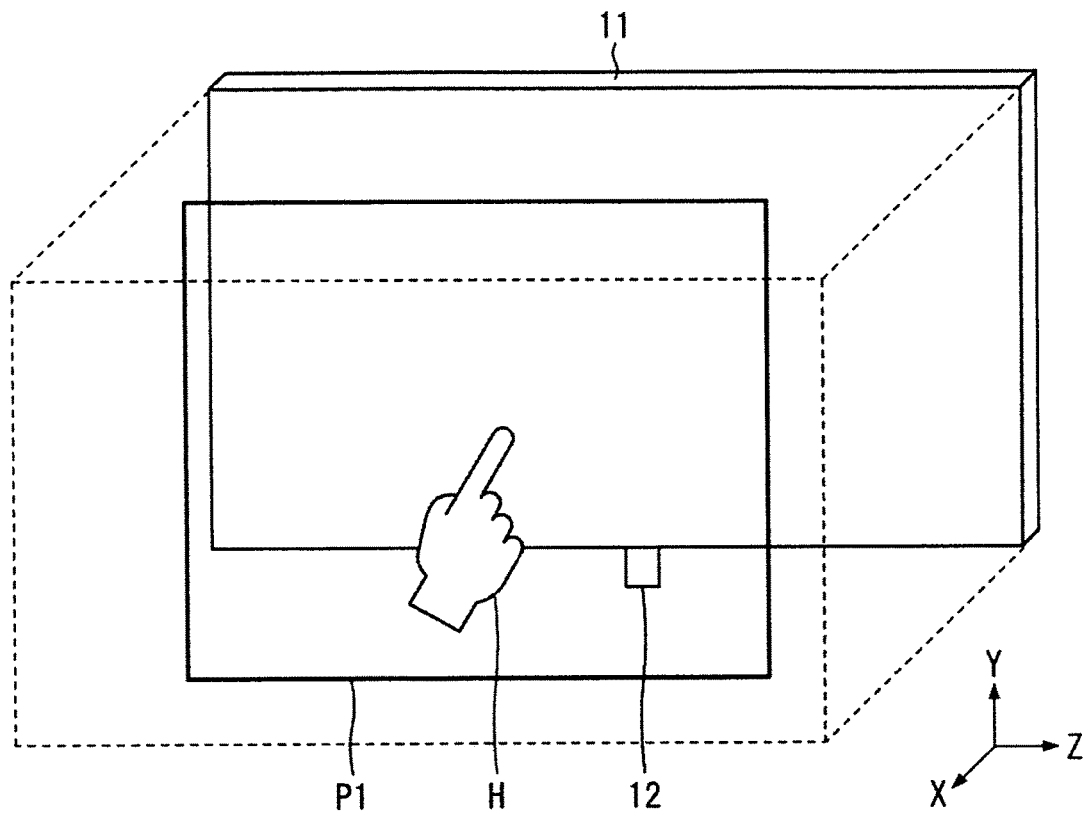
FIG. 3 is a perspective view of the above-mentioned input device in use.

FIG. 3 is a perspective view of the above-mentioned input device 1 in use. In the example illustrated in FIG. 3 the light guide plate 11 and the light source 12 produce a two-dimensional image of a rectangle, i.e., an input location image P1 that appears to float in a space in front of the light guide plate 11. The input location image P1 is formed within a space where the movement detector 20 can detect a user's movements. The user may provide input to the input device 1 by performing a predetermined input action at the location of the input location image P1; more specifically, the user may provide input as if touching the input location image P1 with the hand H. More practically the input device 1 accepts input actions in a space in the input location image P1 where it is conceivable that the hand H would touch; in other words, in the space indicated by the dotted lines in FIG. 3.

Figure 4A:
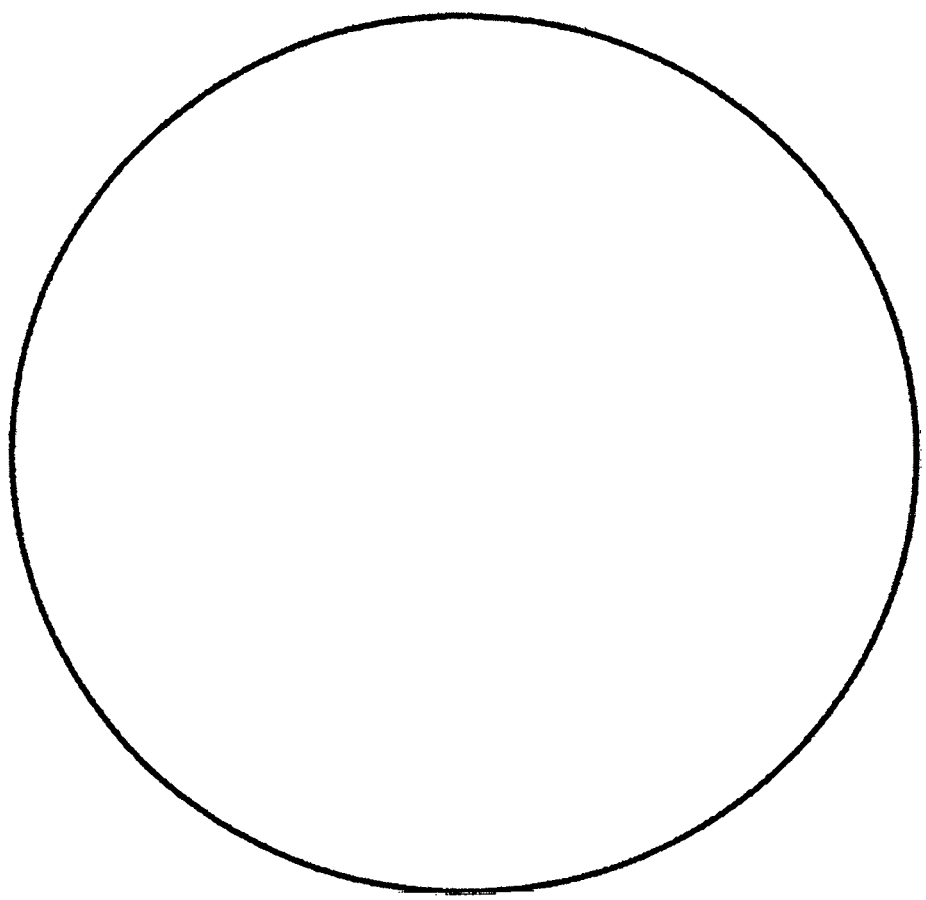
FIG. 4A to FIG. 4C are examples of input location images presented by the above-mentioned display unit.
Figure 4B:
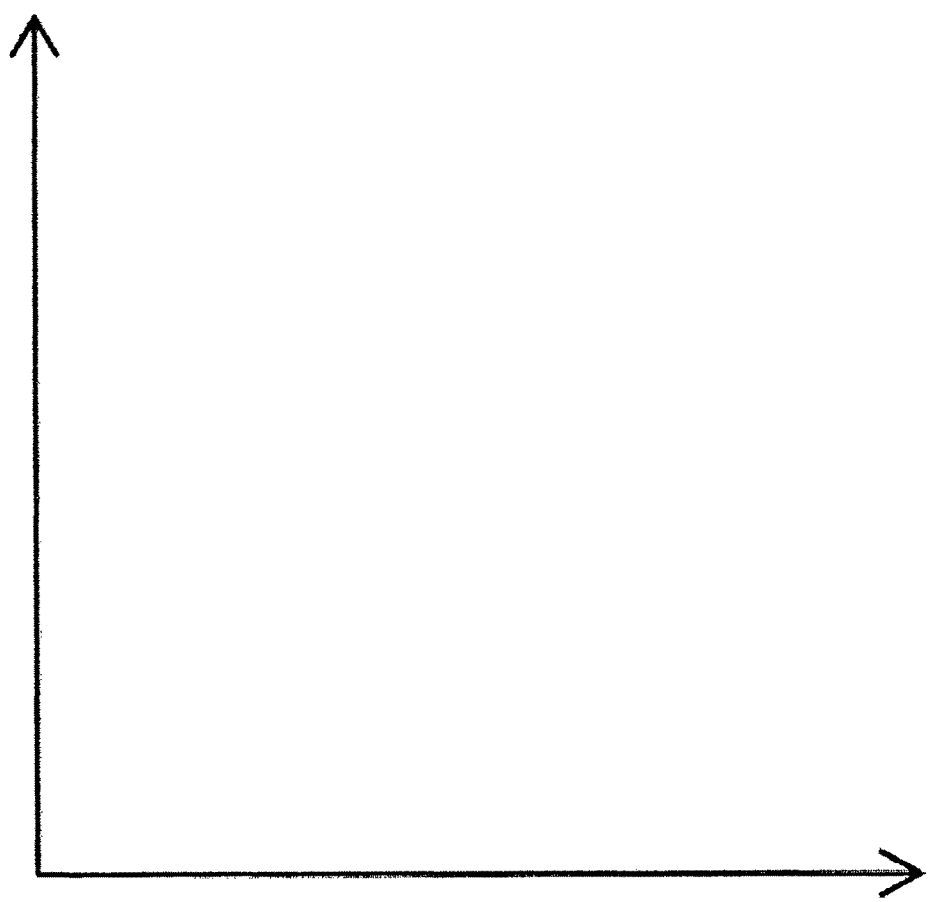
Figure 4C:
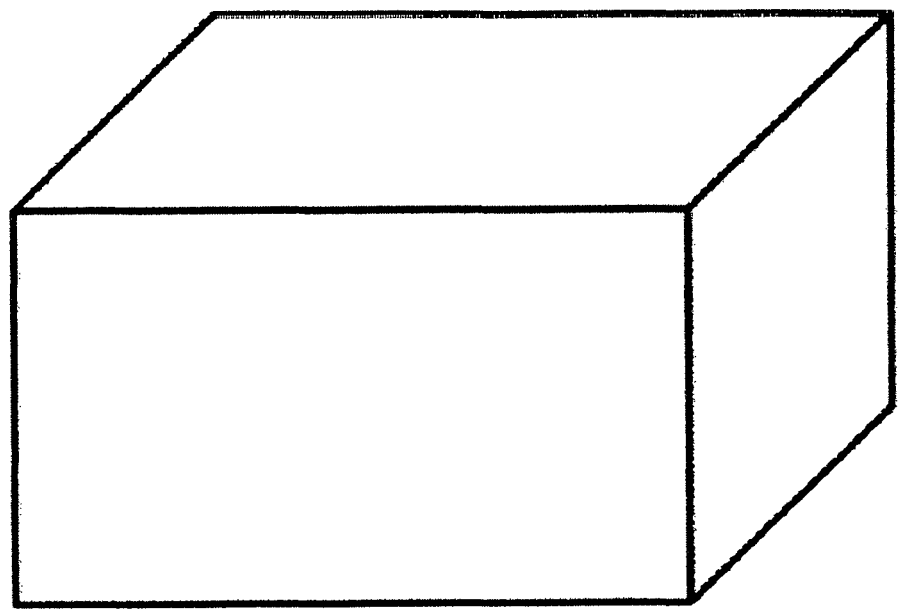

FIG. 4A to FIG. 4C are examples of input location images presented by the display unit 10; FIG. 3 depicts a rectangular frame that represents the input location image presented by the display unit 10. However, the input location image is not limited to a rectangle.

The input location image may be a circle when presented as a two-dimensional image as illustrated in FIG. 4A, or a sphere when presented as a three-dimensional image. The input location image may also be a coordinate axis when presented as a two-dimensional image as illustrated in FIG. 4B, or a right-angled parallelepiped when presented as a three-dimensional image as illustrated in FIG. 4C. The input location image may be a two-dimensional or three-dimensional image different from the images depicted in FIG. 4A through FIG. 4C.

If the input location image is a two-dimensional image, the user may simply perform an input action at a location that is in contact with the plane represented by the two-dimensional image. If the input location image is a three-dimensional image, the user may simply perform an input action in the space represented by the three-dimensional image.

As above described, the display unit 10 in the input device 1 forms an input location image that presents the region wherein the movement detector 20 can detect a user movement. The display unit 10 includes the light source 12 and the light guide plate 11. Light entering the light guide plate 11 from the light source 12 is directed by the light guide plate 11 to exit from the emission surface 11a and produce an image in a space. Accordingly, the user can recognize where the input device 1 accepts input actions via presentation of the input location image formed in a space, and appropriately perform an input action.

Second Embodiment

An input device 2 (gesture input device), which is another embodiment of the present invention is described below in detail. For the sake of convenience, components previously described in an embodiment that have an identical function are given the same reference numerals, and explanations therefor are omitted.

Figure 5:
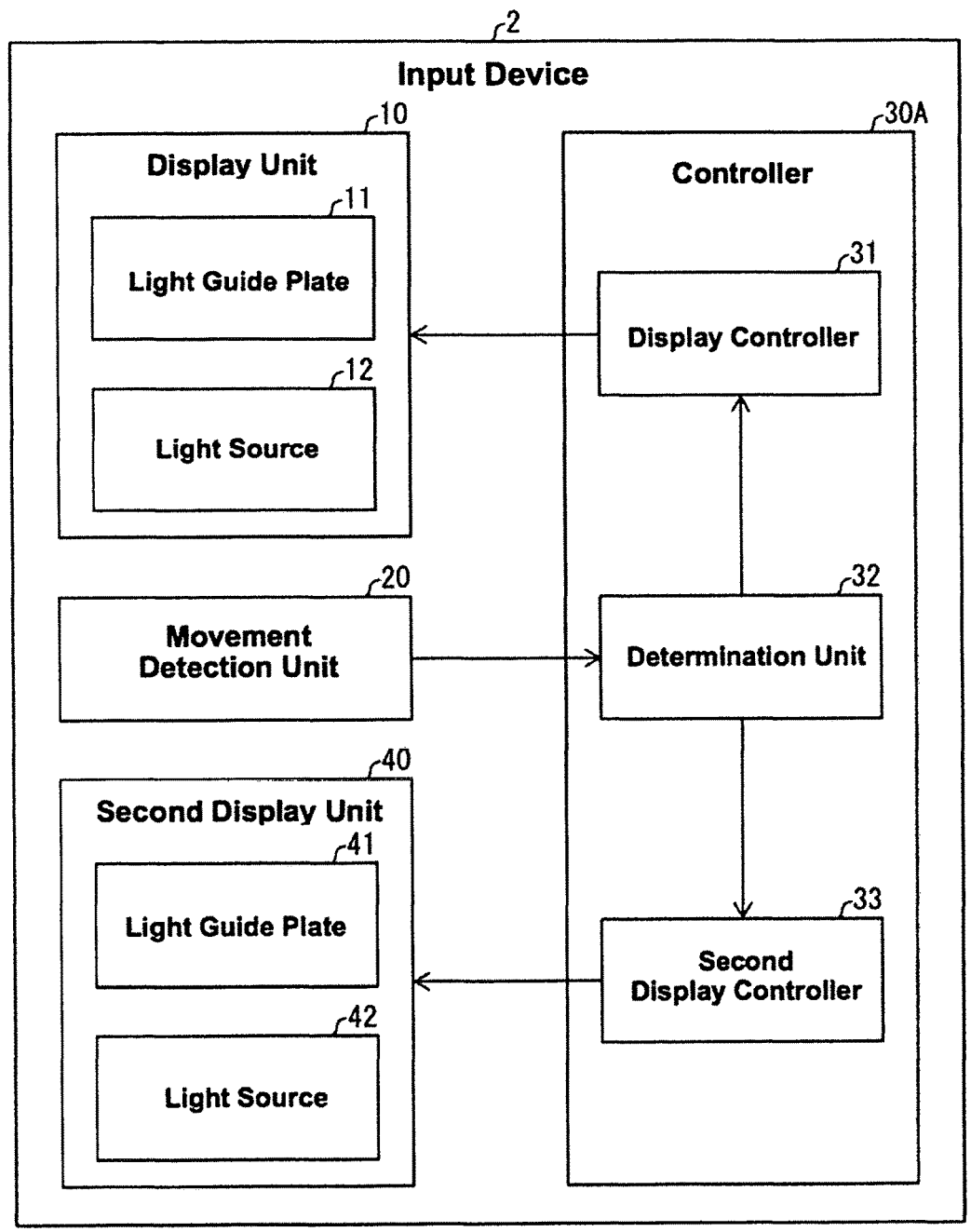
FIG. 5 is a block diagram illustrating the main components of an input device according to a second embodiment of the present invention.

FIG. 5 is a block diagram illustrating the main components of an input device 2 according to an embodiment of the present invention; as illustrated in FIG. 5, the input device 2 differs from the input device 1 as follows:

the presence of a second display unit 40 (i.e., an assessment result presentation unit); and the presence of a controller 30A instead of the controller 30.

The second display unit 40 includes a light source 42 (i.e., a second light source), and a light guide plate 41 (i.e., a second light guide plate) that directs light entering from the light source 42 and causes the light to exit therefrom and form an image in a space. A controller 30A includes the functional components of the controller 30 as well as a second display controller 33.

The second display unit 40 presents the assessment results from the determination unit 32. That is, the second display unit 40 forms an input assessment image in a space with the input assessment image representing the assessment results from the determination unit 32. More specifically, if the determination unit 32 determines that the user movement detected by the movement detector 20 is an input action, the second display unit 40 forms an image corresponding to the assessment result. Note that since the second display unit 40 and the display unit 10 have identical configurations, further detailed descriptions of the second display unit 40 are omitted.

The second display controller 33 controls the presentation of an input assessment image on the second display unit 40 on the basis of an assessment result from the determination unit 32. For example, the second display unit 40 may form a plurality of types of images selectively on the basis of an assessment result from the determination unit 32; in this case, the second display controller 33 controls forming the relevant type of image. In other words, the second display unit 40 may activate a light source corresponding to the assessment result to form a different image according to the assessment result when the determination unit 32 assesses that the user movement detected by the movement detector 20 is an input action. That is, the second display unit 40 may activate a light source to present an image corresponding to the assessment result when the user movement corresponds to an input action.

The display controller 31 also controls the presentation of an input assessment image on the display unit 10 on the basis of an assessment result from the determination unit 32. For instance, the display controller 31 may control the light source 12 to emit a brighter light when the determination unit 32 determines that the user movement detected by the movement detector 20 is an input action.

Figure 6:
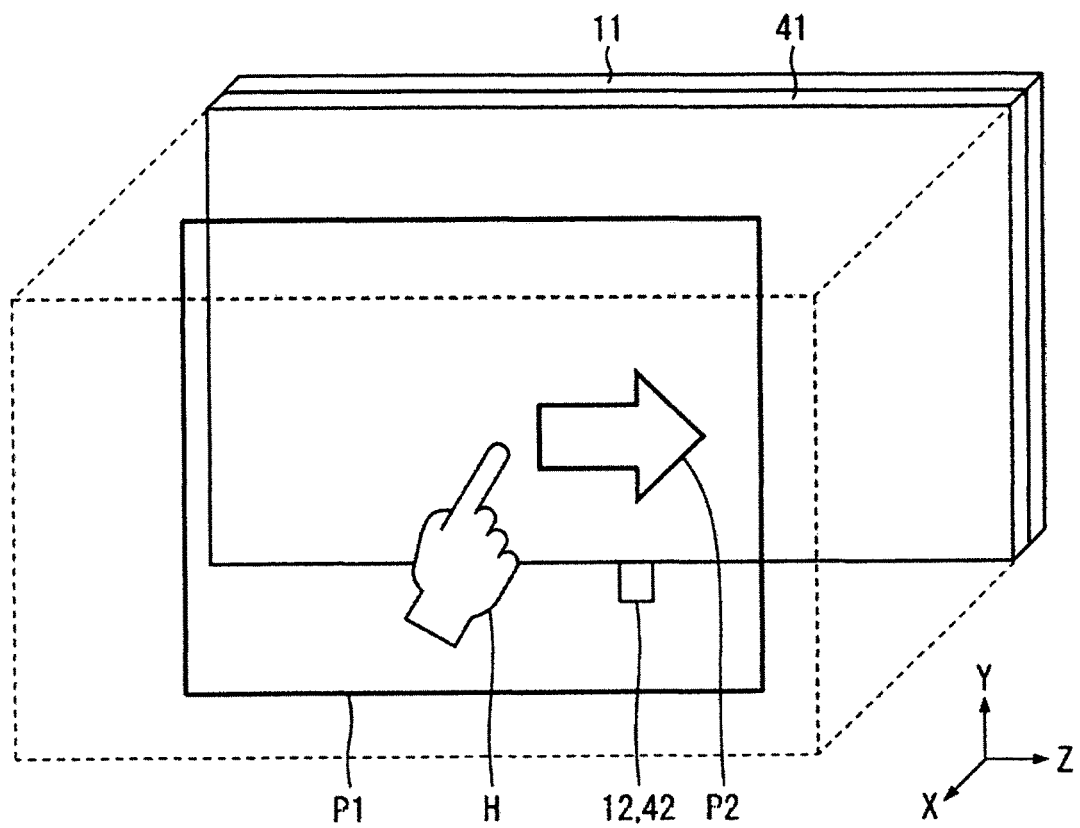
FIG. 6 is a perspective view of the above-mentioned input device in use.

FIG. 6 is a perspective view of the above-mentioned input device 2 in use; in the example illustrated in FIG. 6 the light guide plate 11 and the light source 12 produce a two-dimensional image of a rectangle, i.e., an input location image P1 in a space. The user may provide input to the input device 1 by performing a predetermined input action at the location of the input location image P1; more specifically, the user may provide input as if touching the input location image P1 with the hand H. The light guide plate 41 and the light source 42 cause an input assessment image P2 to be presented in a space with the input assessment image P2 representing the assessment result for the input action performed by the user.

Note that in the example illustrated in FIG. 6 the light guide plate 41 in the second display unit 40 is stacked more toward the positive X axis direction than the light guide plate 11 in the display unit 10. However, the light guide plate 11 may be stacked further toward the positive X axis direction than the light guide plate 41 in the input device 2. Additionally, the light guide plate 41 need not necessarily be stacked on the light guide plate 11. However, preferably the light guide plate 41 and the light guide plate 11 are stacked to reduce the size of the input device 2.

Figure 7A:
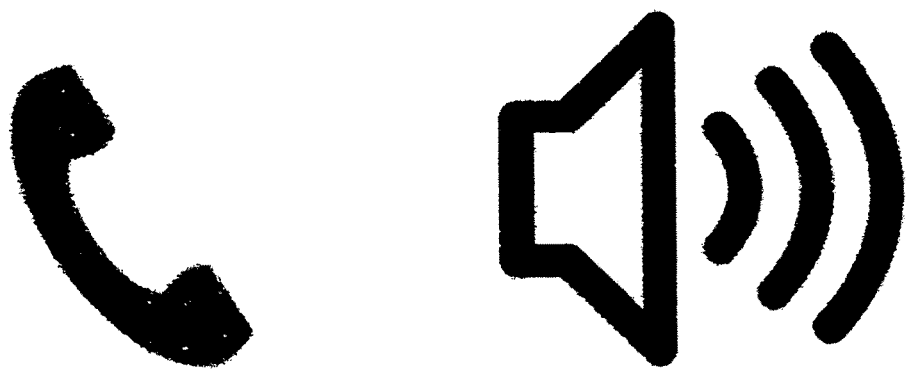
FIG. 7A is an example of a three-dimensional image presented when the assessment result of a determination unit is presented as a three-dimensional image.

FIG. 7A is an example of a three-dimensional image presented when the assessment result of a determination unit is presented as a three-dimensional image; FIG. 7A depicts two types of three-dimensional image. To present a three-dimensional image, for instance, the second display unit 40 may be provided with the number of light guide plates 41 and light sources 42 respectively commensurate with the types of images to be presented for producing light incident on the light guide plates. However, the second display unit 40 is not required to have the number of light guide plates 41 equal to the types of images to be presented.

Figure 7B:
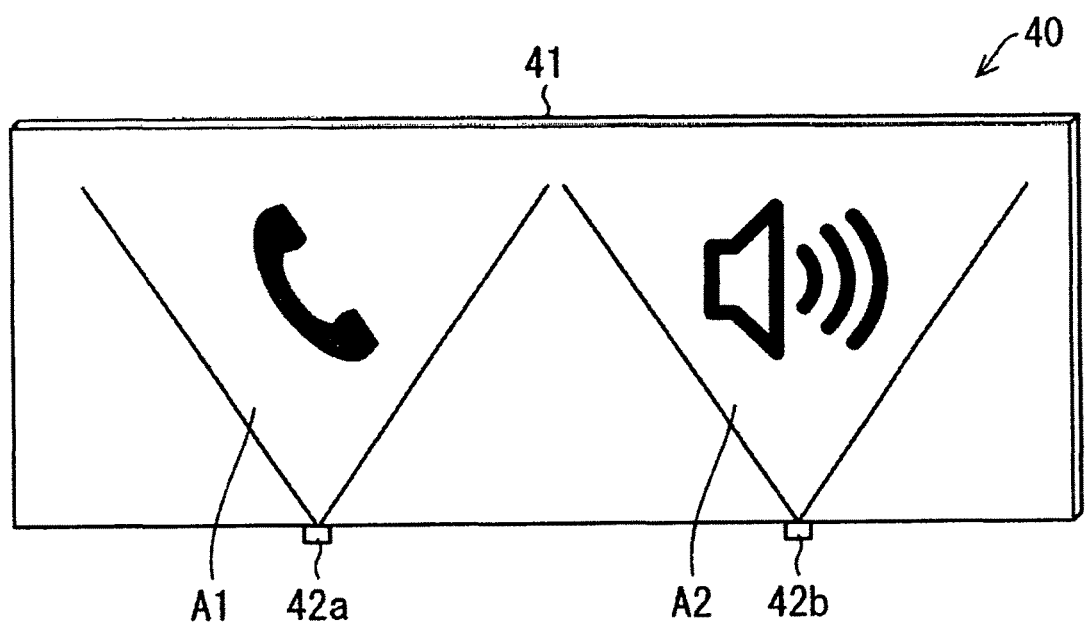
FIG. 7B is an example of a second display unit capable of presenting two types of three-dimensional images via a single light guide plate.

FIG. 7B is an example of a second display unit 40 capable of presenting two types of three-dimensional images via a single light guide plate 41. The second display unit 40 illustrated in FIG. 7B includes a single light guide plate 41 and a light source 42a and a light source 42b. Light emitted from the light source 42a is guided through only one region A1 that is a portion of the light guide plate 41. Light emitted from the light source 42b is guided through only one region A2 that is a portion of the light guide plate 41. The regions A1 and A2 include optical-path changing portions (not shown) that present mutually distinct three-dimensional images. In other words, the light sources 42a and 42b corresponding to mutually different three-dimensional images. Therefore, switching between the light sources 42a and 42b in the second display unit 40 allows two types of mutually different three-dimensional images to be presented. Note that the second display unit 40 may be provided with three or more light sources whereby light incident therefrom is guided via mutually different regions of the light guide plate, thereby allowing the second display unit 40 to present three or more types of three-dimensional images.

Figure 8A:
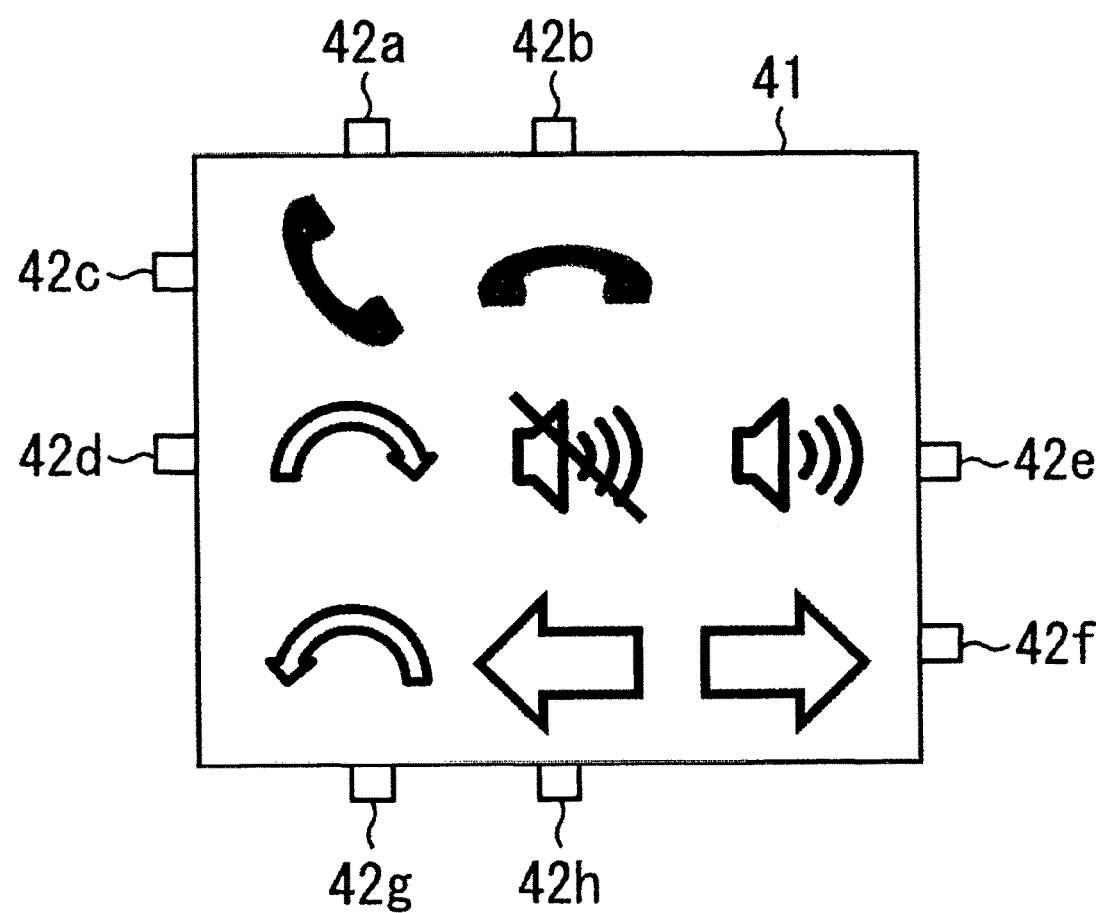
FIG. 8A illustrates an example configuration of a second display unit when an assessment result from a determination unit is presented as a two-dimensional image.

FIG. 8A illustrates an example configuration of the second display unit 40 when an assessment result from the determination unit 32 is presented as a two-dimensional image. A plurality of images may be shown using a single light guide plate when presenting a two-dimensional image. In this case the second display unit 40 includes a plurality of light sources 42, and the light guide plate 41 that directs light entering from the plurality of light sources 42 and causes the light to exit therefrom and form images in a space. The movement detector 20 may detect input actions, and in this case the second display unit 40 activates the light source 42 corresponding to the aforementioned input action to form a different image in a space in accordance with the input action. The second display unit 40 illustrated in FIG. 8A is provided with a light guide plate 41 capable of presenting eight types of two-dimensional images and light sources 42a-42h (i.e., second light sources) corresponding to each of the two-dimensional images.

The light sources 42a-42h are such that light therefrom enters the light guide plate 41 from different directions or at different locations. In the example illustrated in FIG. 8A, light from each pair (i) through (iv) of light sources (i.e., (i) light sources 42a and 42b; (ii) light sources 42c and 42d; (iii) light sources 42e and 42f; and (iv) light sources 42g and 42h) enter the light guide plate 41 from different directions. Light from the light sources 42a, 42b enter the light guide plate 41 from the same direction, and the light sources 42a, 42b are isolated from each other. In the example illustrated in FIG. 8A, the light sources in each of the above mentioned pairs provide light that enter the light guide plate 41 from the same direction with the light sources isolated from each other.

Figure 8B:
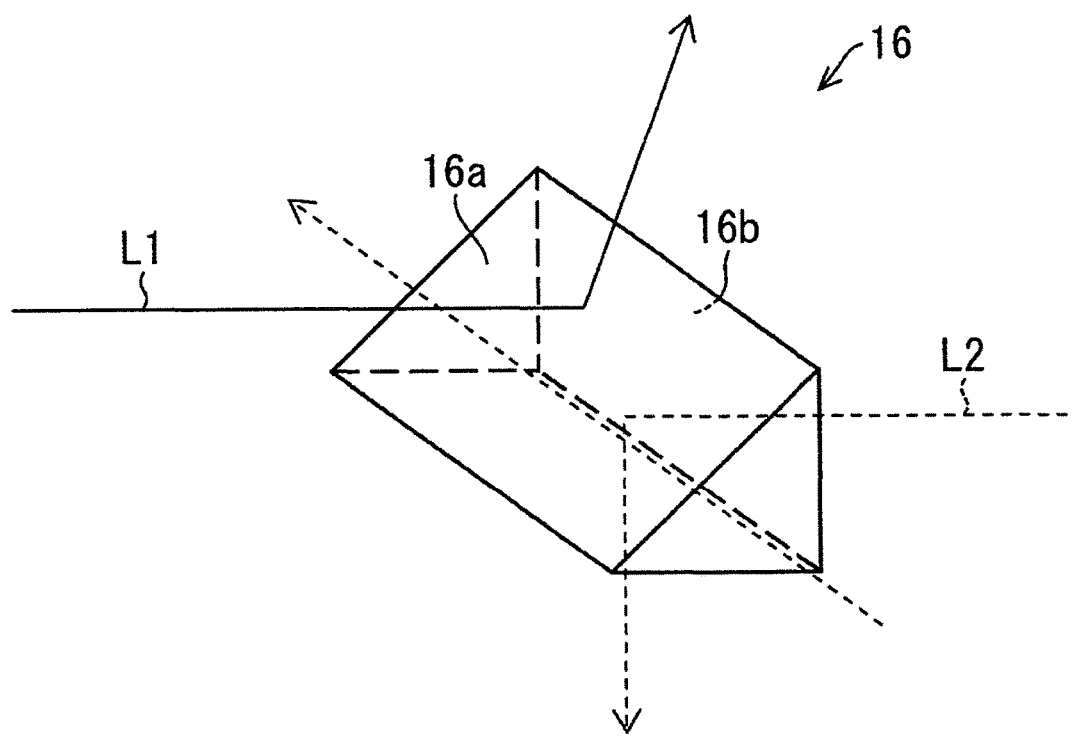
FIG. 8B is a perspective view illustrating a configuration of an optical-path changing portion 16.

FIG. 8B is a perspective view illustrating a configuration of the optical-path changing portions 16. The optical-path changing portions 16 on the light guide plate 41 cause different input assessment images to be presented in accordance with the direction and location at which light is incident on the light guide plate. The optical-path changing portions 16 include a reflection surface 16a that reflects (totally reflects) light incident thereon, and a vertical surface 16b that transmits incident light. Light L1 incident on the reflection surface 60a is totally reflected, and produces the two-dimensional image presented on the second display unit 40. In contrast, light L2 incident on the vertical surface 16b passes through the optical-path changing portion 16, or is reflected opposite the direction that light reflected from the reflection surface 16a produces the two-dimensional image. The second display controller 33 activates the light sources 42a-42h corresponding to the incidence direction and incidence location that will present an input assessment image corresponding to the assessment result from the determination unit 32 and thereby causes the relevant input assessment image to be presented.

As is above described, the second display unit 40 in the input device 2 shows an input assessment image representing the assessment result from the determination unit 32. Accordingly, a user may reference the input assessment image to verify whether or not the input action was assessed as the desired input.

The light sources 42a-42h and the light guide plate 41 may also be provided to the second display unit 40. Therefore, the assessment result from the determination unit 32 may be presented via an input assessment image formed in a space by the second display unit 40.

Note that the assessment result from the determination unit 32 does not need to be presented as an image formed in a space; the assessment result may be presented, for instance, on a display device such as a liquid crystal display, or the like.

Modification Example

The second display device 40 may show an image that is identical to the input location image presented on the display unit 10 where the image is larger than the image presented on the display device 10. In this case, the input action for changing the display size of the input location image may be preliminarily set in the input device 2. When the movement detector 20 detects the aforementioned input action, the input device 2 ends presentation of the input location image on the display unit 10 and begins presentation of the input location image on the second display unit 40.

Third Embodiment

Another embodiment of the present invention is described below in detail. In the embodiment described, an input device 3 (i.e., a gesture input device) is installed in a vehicle. The input device 3 is configured identically to the input device 1. The input device 3 may be configured identically to the input device 2.

Figure 9:
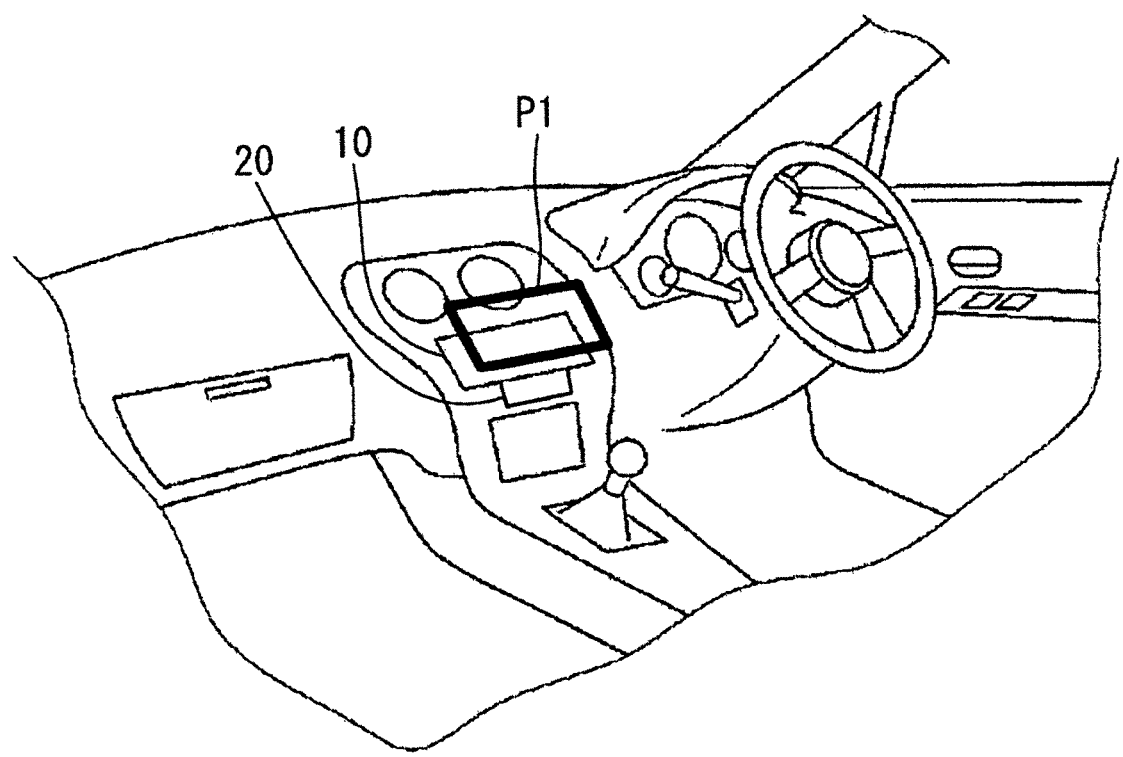
FIG. 9 is a perspective view of a third embodiment of the input device in use.

FIG. 9 is a perspective view of the input device 3 in use according to this embodiment. As illustrated in FIG. 9, the display unit 10 and the movement detector 20 of the input device 3 is provided in a center console of the vehicle. The input location image P1 is also presented near the center console. The input device 3 is configured identically to the input device 2; that is, the input device 3 may include the second display unit 40. In this case, the second display device 40 is also provided in the vehicle center console. The determination unit 32 in the input device 3 may be implemented as a function included in a control device in the vehicle. An input device 3 thusly configured may allow a user to provide input to the vehicle.

Fourth Embodiment

Another embodiment of the present invention is described below in detail.

Without being limited to the above described vehicle, the input device 1 may be adopted in various kinds of electronic devices that accept input from a user. Additionally, the input device 2 may be adopted in various devices instead of the input device 1.

Figure 10A:
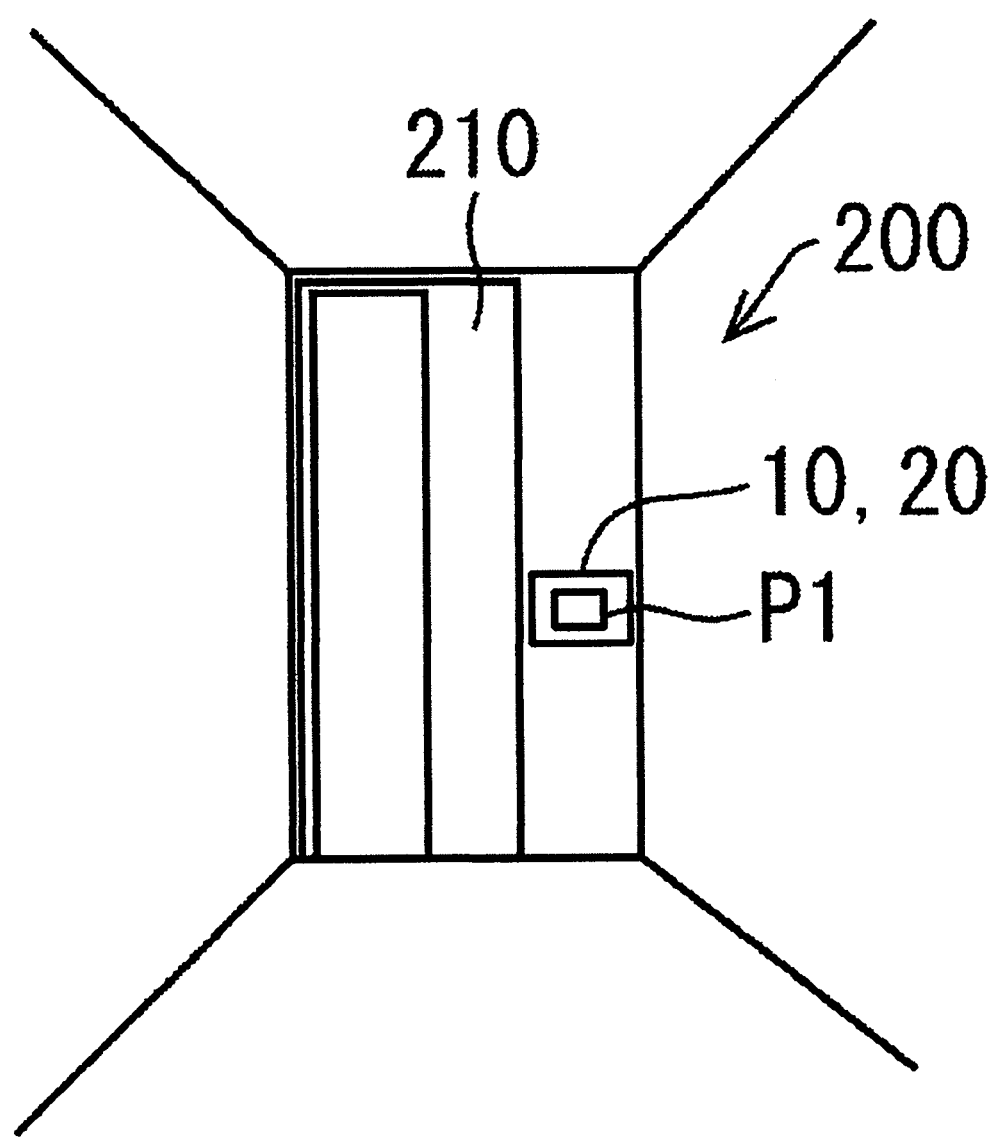
FIG. 10A illustrates an example of an input device according to the first embodiment installed in an elevator.

FIG. 10A illustrates an example of the input device 1 installed in an elevator 200. The display device 10 and the movement detector 20 of the input device 1 are provided, for instance, near the door 210 of the elevator 200. A user may perform an input action in the input location image P1 presented by the display unit 10 to perform an operation such as opening or closing the door 210.

Figure 10B:
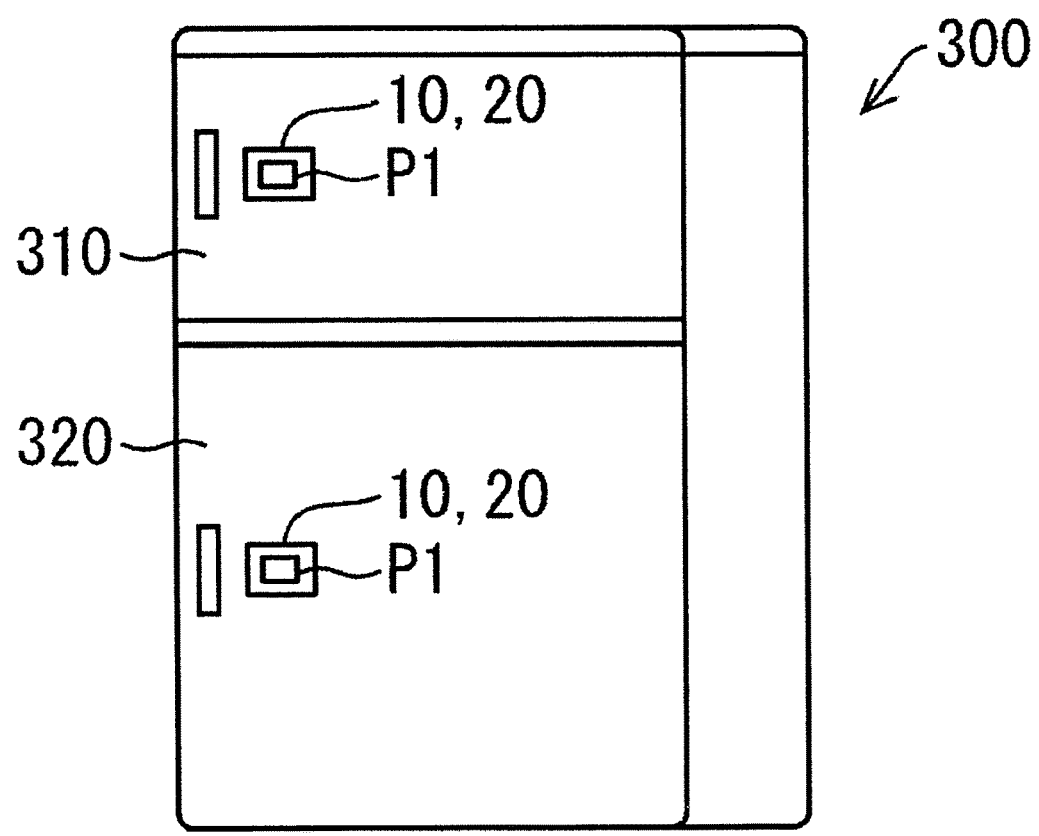
FIG. 10B illustrates an example of an input device according to the first embodiment installed in a refrigerator.

FIG. 10B illustrates an example of the input device 1 installed in a refrigerator 300. The refrigerator 300 includes a door 310 to the freezer unit, and a door 320 to the refrigerator unit. The display device 10 and the movement detector 20 of the input device 1 are provided near the door handles of each door 310 and 320. The user may perform an input action in the input location image P1 presented by the display unit 10 to manipulate, for instance, the temperature of the freezer unit and the refrigerator unit, the operation mode, or the like.

Figure 10C:
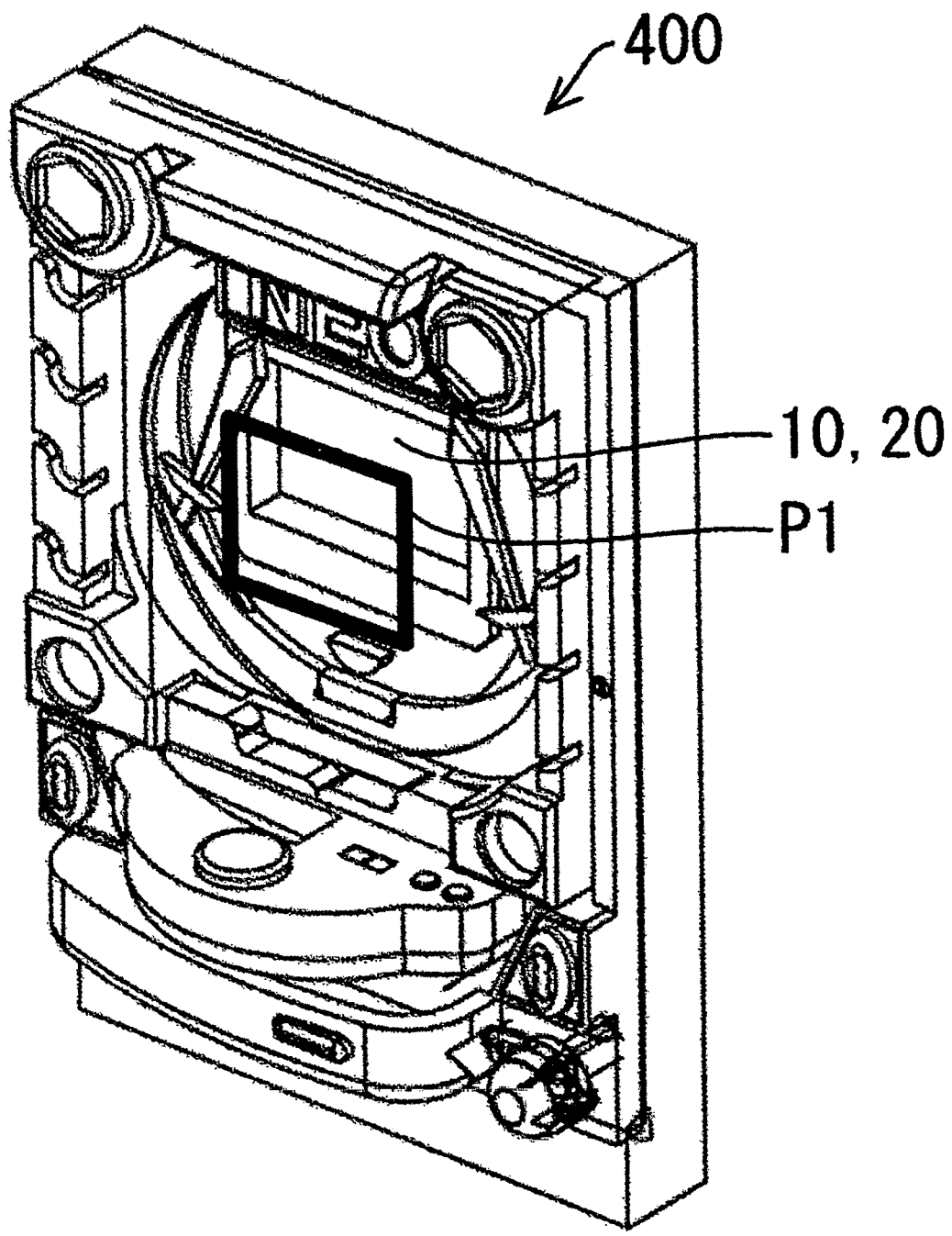
FIG. 10C is an example illustrating an input device according to the first embodiment installed in a game machine.

FIG. 10C illustrates an example of the input device 1 installed in a game machine 400. The display device 10 and the movement detector 20 of the input device 1 are provided near the center of the surface facing the user. The user may perform an input action in the input location image P1 presented by the display unit 10 to manipulate an effect presented on the game machine 400 (e.g., a gesture input in accordance with a message presented on a liquid crystal display in the game machine 400, or manipulate the reel while slot effects are being presented) or manipulate the speed or direction for launching a pinball.

The input device 1 may also be installed in a television or an audio device, for instance. In this case the user may perform an input action in the input location image P1 presented by the display unit 10 to perform an operation such as changing the channel or the volume.

The input device 1 may also be installed in a photo frame. In this case the user may perform an input action in the input location image P1 presented by the display unit 10 to perform an operation such as changing the image to be shown.

The input device 1 may also be installed in a digital camera. In this case the user may perform an input action in the input location image P1 presented by the display unit 10 to perform an operation such as magnifying or reducing the image capture region, and capturing an image.

Additionally, the input device 1 may be installed in an air conditioning device (air conditioner). In this case the user may perform an input action in the input location image P1 presented by the display unit 10 to perform an operation such as (1) setting the air temperature, or (2) changing the operation mode to cooling or heating.

The input device 1 may also be installed on a tablet. In this case the user may perform an input action in the input location image P1 presented by the display unit 10 to perform any desired operation preliminarily associated with the aforesaid input action. In other words, the input device 1 may also function as a general purpose input device.

Note that each of these devices may further include a separate display device such as a liquid crystal display or the like. In this case the display unit 10 in the input device 1 may be superimposed on the liquid crystal display and controlled to magnify the contents displayed on the liquid crystal display and form an image in that space.

Fifth Embodiment

Another embodiment of the present invention is described below in detail.

In each of the above-described embodiments the input devices 1-3 include the display unit 10 illustrated in FIG. 2. However, the input devices 1-3 may include the below-described display unit 10A, 10B, or 10C instead of the display unit 10 or the second display unit 40.

Display Unit 10A

Figure 11A:
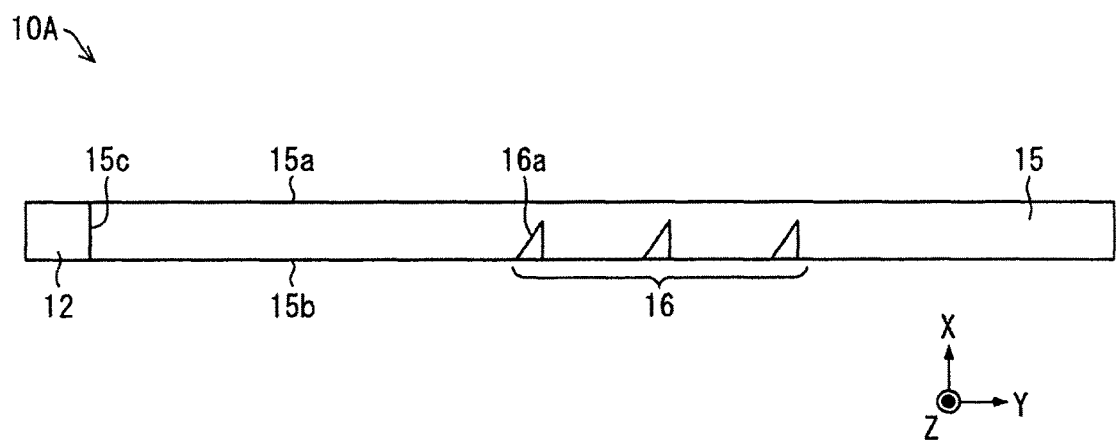
FIG. 11A is a cross-sectional view illustrating an example configuration of a display unit according to a fifth embodiment.
Figure 11B:
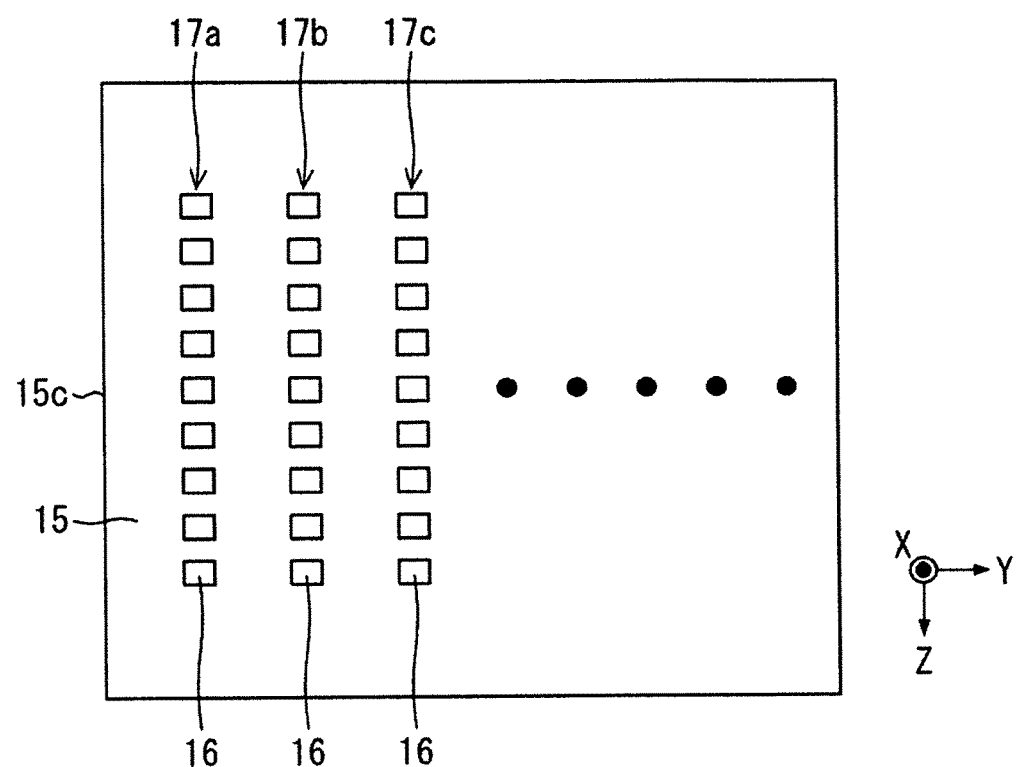
FIG. 11B is a plan view illustrating the configuration of a light guide plate provided in the display unit illustrated in FIG. 11A.

FIG. 11A is a cross-sectional view illustrating a configuration of the display unit 10A (i.e., an image projector). As illustrated in FIG. 11A, the display unit 10A includes a light source 12, and a light guide plate 15 (i.e., a first light guide plate). FIG. 11B is a plan view illustrating a configuration of the light guide plate 15 in the display unit 10A.

The light guide plate 15 guides light entering from the light source 12 (i.e., incident light). The light guide plate 15 is produced from a transparent resin material with a relatively high index of refraction. The light guide plate 15 may be produced using, for instance, a polycarbonate resin, a poly methyl methacrylate resin, glass or the like. In this embodiment the light guide plate 15 is produced from a poly methyl methacrylate resin. The light guide plate 15 includes an emission surface 15a (i.e., a light emitting surface), a rear surface 15b, and an incidence surface 15c as illustrated in FIG. 11A.

The emission surface 15a outputs light that is guided by the light guide plate 15 and modified by an optical-path changing portion 16 identical to the optical-path changing portions described in the second embodiment. The emission surface 15a is configured as the front surface of the light guide plate 15. The rear surface 15b and the emission surface 15a are mutually parallel, and the later-described optical-path changing portion 16 is arranged thereon. Light emitted from the light source 12 is incident on the light guide plate 15 at the incidence surface 15c.

Light emitted from the light source 12 and entering the light guide plate 15 from the incidence surface 15c is totally reflected between the emission surface 15a and the rear surface 15b and guided through the light guide plate 15.

As illustrated in FIG. 11A, an optical-path changing portion 16 is formed on the rear surface 15b inside the light guide plate 15; the optical-path changing portion 16 changes the optical path of light guided through the light guide plate 15 and causes the light to exit from the emission surface 15a. A plurality of optical-path changing portions 16 is provided on the rear surface 15b of the light guide plate 15.

The optical-path changing portions 16 are provided along a direction parallel to the incidence surface 15c. The optical-path changing portions 16 are tetrahedrons provided with reflection surfaces 16a that reflect (totally reflect) light entering the light guide plate. For example, the optical-path changing portions 16 may be recesses formed in the rear surface 15b of the light guide plate 15. Note that the optical-path changing portions 16 are not limited to being tetrahedrons. As illustrated in FIG. 11B, the plurality of optical-path changing portions 16 may be made up of a plurality of groups of optical-path changing portions 17a, 17b, 17c formed on the rear surface 15b of the light guide plate 15.

The plurality of optical-path changing portions 16 in each group of optical-path changing portions 17a, 17b, 17c are arranged on the rear surface 15b of the light guide plate 15 so that the angles of the reflection surfaces 16a are mutually different in relation to the direction from which light is incident. Thus, each group of optical-path changing portions 17a, 17b, 17c changes the optical path of the incident light and causes the light to exit in various directions from the emission surface 15a.

Next, the method of how the display unit 10A forms the stereoscopic image I is described with reference to FIG. 12. In this case the plane perpendicular to the emission surface 15a of the light guide plate 15 is the stereoscopic image forming plane P, and light modified by the optical-path changing portions 16 form a stereoscopic image I as a planar image in the stereoscopic image forming plane P.

Figure 12:
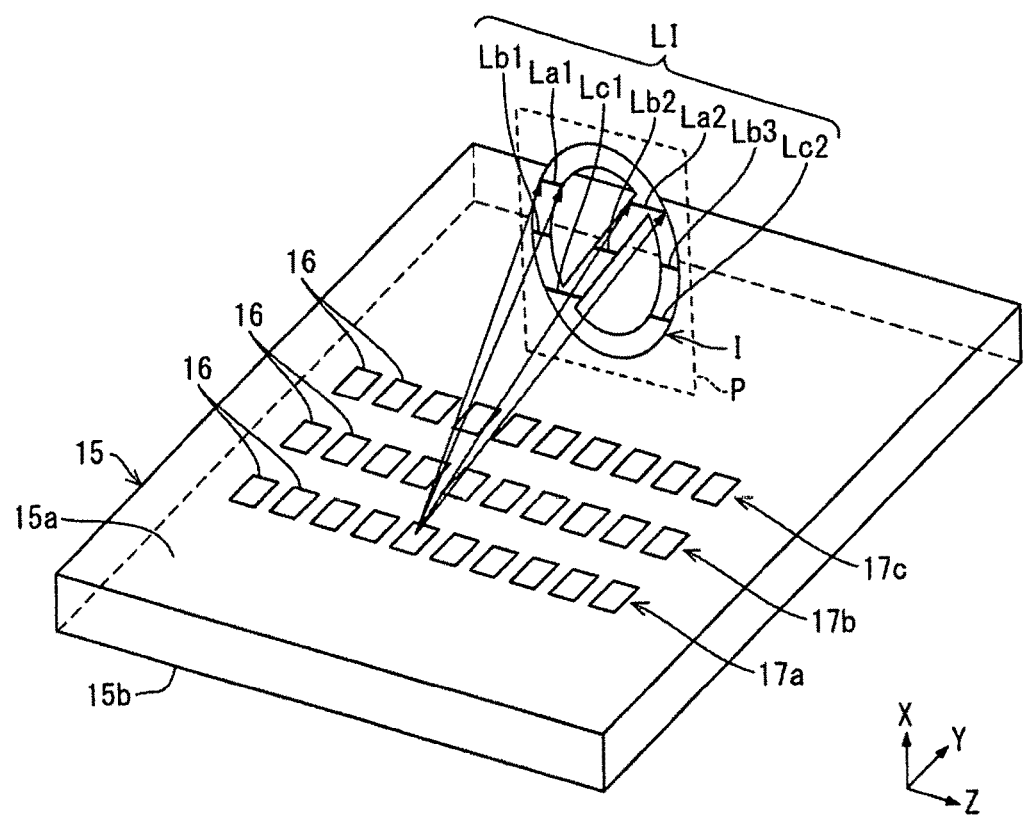
FIG. 12 is a perspective view illustrating how the display unit illustrated in FIG. 11A produces a stereoscopic image.

FIG. 12 is a perspective view illustrating how the display unit 10A produces the stereoscopic image I. Note that in the case described, the stereoscopic image I formed in the stereoscopic image forming plane P is a circle with an oblique line therethrough.

As illustrated in FIG. 12, the optical-path changing portions 16 from a group of optical-path changing portions 17a may change the optical path of light in the display unit 10A so that the modified light intersects with the lines La1 and La2 in the stereoscopic image forming plane P. Hereby a line image LI, which is a portion of the stereoscopic image I is formed in the stereoscopic image forming plane P. The line image LI is parallel to the YZ plane. Thus, light from multiple optical-path changing portions 16 belonging to the group of optical-path changing portions 17a create a line image LI from the line La1 and the line La2. Light creating an image of the line La1 and the line La2 only need optical-path changing portions 16 in the group of optical-path changing portions 17a.

Similarly, light whose optical path changes due to the optical-path changing portions 16 in a group of optical-path changing portions 17b intersect with the lines Lb1, Lb2, and Lb3 in the stereoscopic image forming plane P. Hereby a line image LI, which is a portion of the stereoscopic image I is formed in the stereoscopic image forming plane P.

Light whose optical path changes due to the optical-path changing portions 16 in a group of optical-path changing portions 17c intersects with the lines Lc1 and Lc2. Hereby a line image LI, which is a portion of the stereoscopic image I is formed in the stereoscopic image forming plane P.

The groups of optical-path changing portions 17a, 17b, 17c . . . form line images LI at mutually different positions along the X axis direction. Reducing the distance between the groups of optical-path changing portions 17a, 17b, 17c . . . in the display unit 10A reduces the distance between the line images LI produced by the groups of optical-path changing portions 17a, 17b, 17c . . . along X axis direction. As a result, the optical-path changing portions 16 in the groups of optical-path changing portions 17a, 17b, 17c . . . in the display unit 10A change the optical path of light whereby grouping the plurality of line images LI created by this light forms a stereoscopic image I as a planar image in the stereoscopic image forming plane P.

Note that the stereoscopic image forming plane P may be perpendicular to the X axis, perpendicular to the Y axis, or perpendicular to the Z axis. Additionally, the stereoscopic image forming plane P may be non-vertical relative to the X axis, the Y axis, or the Z axis. Moreover, the stereoscopic image forming plane P may be curved instead of a flat plane. In other words, the display unit 10A may form a stereoscopic image I in any desired plane in space (flat or curved) by way of the optical-changing portions 16. A three-dimensional image may thus be formed by a combination of a plurality of planar images.

Display Unit 10B

Figure 13A:
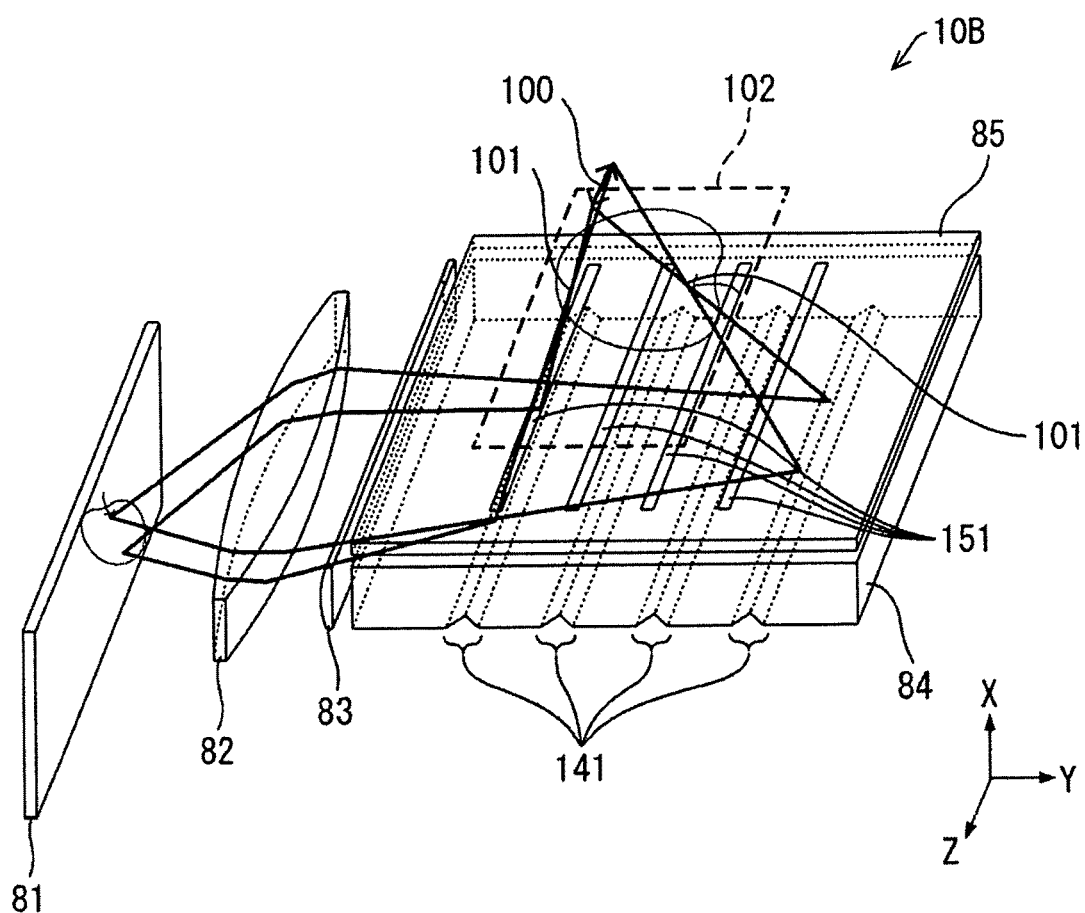
FIG. 13A is a perspective view of a display unit of a fifth embodiment that is distinct from the display unit in FIG. 11A.
Figure 13B:
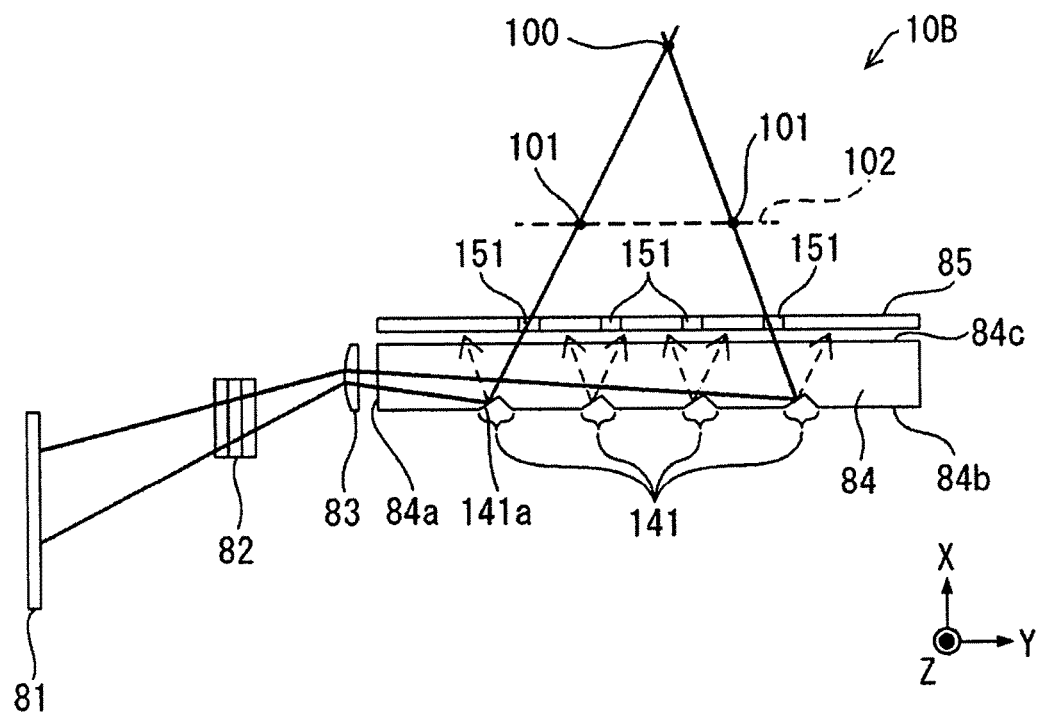
FIG. 13B is a cross-sectional view illustrating a configuration of the display unit in FIG. 13A.
Figure 14:
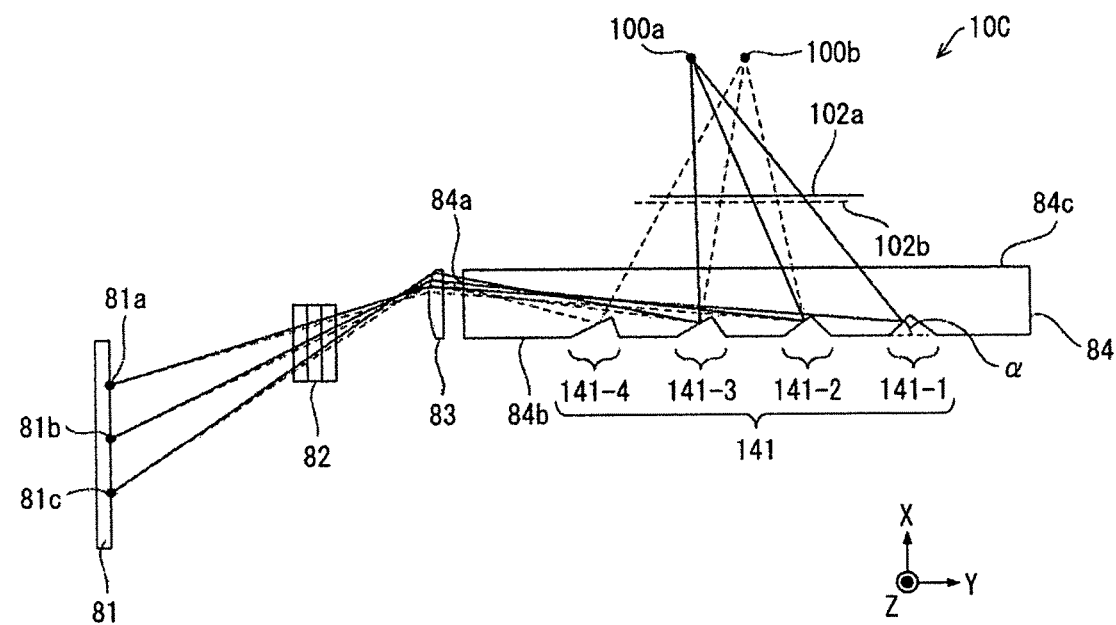
FIG. 14 is a cross-sectional view illustrating a display unit of the fifth embodiment that is distinct from the display units illustrated in FIG. 11A and FIG. 13A.

FIG. 13A is a perspective view of a display unit 10B (i.e., an image projector); FIG. 13B is a cross-sectional view depicting a configuration of the display unit 10B.

As illustrated in FIG. 13A and FIG. 13B, the display unit 10B includes an image display device 81 (i.e., first light source); an image forming lens 82, a collimating lens 83, a light guide plate 84 (i.e., first light guide plate), and a mask 85. The image display device 81, the image forming lens 82, the collimating lens 83, and the light guide plate 84 are arranged in this order along the Y axis direction. In addition, the light guide plate 84 and the mask 85 are arranged in this order along the X axis direction.

The image display device 81 presents a two-dimensional image that is projected in a space via the display unit 10B in the display area in accordance with an image signal received from a control device (not shown). The image display device 81 is, for instance, a typical liquid crystal display that is capable of outputting image light by displaying an image in a display region. In the example depicted, the display region of the image display device 81 and the incidence surface 84a which faces said display region in the light guide plate 84 are both arranged parallel to the XZ plane. The rear surface 84b and the emission surface 84c (i.e., a light emitting surface) in the light guide plate 84 are arranged parallel to the YZ plane. The emission surface 84b, which emits light onto the mask 85, faces the rear surface 84c whereon prisms 141 (later described) are provided. Additionally, the surface whereon slits 151 are provided in the mask 85 (later described) is parallel to the YZ plane. Note that the display region in the image display device 81 and the incidence surface 84a in the light guide plate 84 may face each other, or the display region in the image display device 81 may be inclined relative to the incidence surface 84a.

The image forming lens 82 is disposed between the image display device 81 and the incidence surface 84a. Image light exits the image display device 81 and enters the image forming lens 82, and the image forming lens 82 focuses the image light in the XZ plane; the image light exits the image forming lens 82 and enters the collimating lens 83. Note that the XY plane is parallel to the length of the incidence surface 84a. The image forming lens 82 may be of any type so long as it is capable of focusing the image light. The image forming lens 82 may be a bulk lens, a Fresnel lens, a diffraction lens, or the like. The image forming lens 82 may also be a combination of a plurality of lenses arranged along the Y axis direction.

The collimating lens 83 is disposed between the image display device 81 and the incidence surface 84a. The collimating lens 83 collimates the image light focused by the image forming lens 82 onto the XY plane; the XY plane is orthogonal to the length of the incidence surface 84a. Collimated light exiting the collimating lens 83 enters the incidence surface 84a of the light guide plate 84. Similarly to the image forming lens 82, the collimating lens 83 may be a bulk lens, or a Fresnel lens. The image forming lens 82 and the collimating lens 83 may be arranged in the opposite order. Additionally, the functions of the image forming lens 82 and the collimating lens 83 may be achieved through a single lens or though a combination of multiple lenses. In other words, the combination of the image forming lens 82 and the collimating lens 83 may be configured in any manner so long as the image light output from the display region of the image display device 81 converges in the XZ plane, and collimated in the XY plane.

The light guide plate 84 is a transparent resin; image light collimated by the collimating lens 83 enters the light guide plate 84 at the incidence surface 84a and exits the light guide plate 84 from the emission surface 84. In the example depicted, the light guide plate 84 is a flat rectangular panel with the surface facing the collimating lens 83 and parallel to the XZ plane taken as the incidence surface 84a. The rear surface is taken as the surface parallel to the YZ plane and located in the negative X axis direction while the emission surface 84c is taken as the surface parallel to the YZ plane and facing the rear surface 84b. A plurality of prisms 141 (i.e., emitting structures, optical-path changing portions) is provided in light guide plate 84.

The plurality of prisms 141 reflects the image light entering the light guide plate from the incident surface 84a. The prisms 141 are provided on the rear surface 84b of the light guide plate 84 protruding therefrom toward the emission surface 84c. For example, if image light propagates along the Y axis direction, the plurality of prisms 141 may be substantially triangular grooves with a predetermined width in the Y axis direction (e.g., 10 µm) and arranged at a predetermined interval along the Y axis direction (e.g., 1 mm). The prisms 141 include a reflective surface 141a, which is the optical surface closer to the incidence surface 84a relative to the direction along which the image light travels (i.e., the positive Y axis direction). In the example depicted, the plurality of prisms 141 is provided parallel to the Z axis on the rear surface 84b. Thus, the reflection surfaces 141a in the plurality of prisms 141 are provided parallel to the Z axis and orthogonal to the Y axis; the reflection surfaces 141a reflect the image light entering from the incidence surface 84a and propagating along the Y axis direction. Each of the plurality of prisms 141 causes image light emitted from mutually different positions in the display region of the image display device 81 along the direction orthogonal to the length of the incidence surface 84a (i.e., the Y axis) to exit from the emission surface 84c. That is the prisms 141 allow image light to exit from one surface of the light guide plate 84 toward a predetermined viewpoint 100. Details of reflection surfaces 141a are described later.

The mask 85 is configured from a material that is opaque to visible light and includes a plurality of slits 151. The mask 85 only allows light emitted from the emission surface 84c of the light guide plate 84 and oriented toward the image forming point 101 in a plane 102 to pass therethrough via the plurality of slits 151.

The plurality of slits 151 only allows light emitted from the emission surface 84c of the light guide plate 84 that is oriented towards the image forming point 101 in a plane 102 to pass therethrough. In the example depicted, the plurality of slits 151 is provided parallel to the Z axis. Individual slits 151 may also correspond to any prism 141 in the plurality of prisms 141.

When configured as above described, a display unit 10B forms and projects the image presented by the image display device 81 onto an imaginary plane 102 outside the display unit 10B. More specifically, image light emitted from the display region in the image display device 81 passes through the image forming lens 82 and the collimating lens 83, whereafter the image light enters the incidence surface 84a which is one end surface of the light guide plate 84. Subsequently, the image light incident on the light guide plate 84 propagates therethrough and arrives at the prisms 141 provided on the rear surface 84b of the light guide plate 84. The reflection surfaces 141a reflect the image light arriving at the prisms 141 toward the positive X axis direction and thereby causes the image light to exit the light guide plate 84 from the emission surface 84c which is parallel to the YZ plane. The image light emitted from the emission surface 84c and passing through the slits 151 of the mask 85 form an image of the image forming point 101 in the plane 102. In other words, image light emanating from points in the display region of the image display device 81 converge in the XZ plane, collimate in the XY plane and thereafter is projected onto an image forming point 101 in a plane 102. The display unit 10B processes all the points in the display region in the aforementioned manner to thereby project an image output in the display region of the image display device 81 onto the plane 102. Thus, when a user views this imaginary plane 102 from a viewpoint 100, the user perceives the image that is projected in air. Note that the plane 102 whereon the projected image is formed is a virtual plane; however, a screen may be disposed in the plane 102 to improve visibility.

Display Unit 10C

FIG. 13B is a cross-sectional view depicting a configuration of the display unit 10C. Instead of merely eliminating the mask 85 from the display unit 10B, the display unit 10C modifies the configuration of the prisms in the light guide plate 84. Only the differences from the above configurations are described below.

The angle $\alpha$ between the reflection surface of a prism 141 and the rear surface 84b in the display unit 10C increases with distance from the incidence surface 84a. Note that the angle $\alpha$ of the prism 141 that is furthest from the incidence surface 84a is preferably an angle that causes total reflection of light in the image display device 81.

Light emanates from a point on the display region of the image display device 81 and oriented toward a predetermined viewpoint such as the viewpoint 100a or the viewpoint 100b; with the angles configured as above described the closer this emanation point is to the rear surface 84b i.e., more toward the X axis direction, the further away the prism 141 from the incidence surface 84a that reflects this light. However, without being limited to this configuration, it is sufficient to map a location in the X axis direction on the display region of the image display device 81 to a prism 141. In the display unit 10C, prisms 141 farther from the incidence surface 84a also reflect light more toward the incidence surface 84a. Whereas, prisms 141 closer to the incidence surface 84a reflect light more toward a direction away from the incidence surface 84a. Therefore, the display unit 10C is capable of emitting light from the image display device 81 toward a specific viewpoint even without the mask 85. The display unit 10C projects light exiting from the light guide plate 84 to form an image in a plane perpendicular to the X axis direction so that the image diffuses in accordance with distance from the plane in the X axis direction. Given that as a result the display unit 10C may create a parallax effect in the X axis direction whereby an observer may align both eyes along the X axis direction to stereoscopically view an image projected in the X axis direction.

Given that none of the light reflected by the prisms 141 and oriented towards the [desired] viewpoint is blocked in the display unit 10C, an observer may see an image presented on the image display device 81 and projected in the air even if the observer's viewpoint moves along the Y axis direction. However, the angle between light rays from the prisms 141 oriented toward the viewpoint and the reflection surface of the prisms 141 changes with the location of the viewpoint along the Y axis direction; therefore, the position of the viewpoint in the image display device 81 corresponding to the light ray also changes with the location of the viewpoint along the Y axis direction.

For instance, when viewed from the viewpoint 100a, light from each of the points 81a-81c in the image display device 81 are reflected by prisms 141-1, 141-2, 141-3 respectively to form an image on the projection plane 102a (with points 81a, 81b, 81c in order from the observer; and prisms 141-1, 141-2, 141-3, 141-4 in order from the incidence surface 84a toward the far end).

In contrast, assume that the observer's eyes move to the viewpoint 100b which is further from the incidence surface 84a that the viewpoint 100a. In this case, at viewpoint 100b the observer may observe light emitted from the light guide plate 84 toward a direction further away from the incidence surface 84a than at viewpoint 100a.

The angle α between the reflection surface of a prism 141 and the rear surface 84b in the display unit 10C increases with distance from the incidence surface 84a. Therefore, for example the light from each of the points 81a-81c is reflected by the prisms among prisms 141-1-141-4 that are closer to the incidence surface 84a forms an image in the projection plane 102b and then travels toward the viewpoint 100b. Consequently, even if the observer's viewpoint changes along the Y axis direction, the location of the projected image hardly shifts. Additionally, in this example light from each of the points in the image display device 81 is also formed in the Y axis direction to some extent due to the prisms 141. Therefore, an observer with both eyes aligned along the Y axis direction may also view a stereoscopic type image.

Moreover, the display unit 10C does not use a mask; therefore, this reduces the loss of light intensity and allows for a brighter image to be projected into a space. Additionally, since the display unit 10C does not use a mask, an object behind the light guide plate 84 (not shown) and the projected image may both be perceived by an observer.

When configured as above described, similar to the display unit 10B, the display device 10C forms and projects the image presented by the image display device 81 onto an imaginary plane 102 outside the display unit 10C.

The present invention is not limited to each of the above described embodiments, and may be modified in various ways and remain within the scope of the claims. The technical means disclosed in each of the different embodiments may be combined as appropriate, and an embodiment obtained in such a manner remains within the technical scope of the present invention.

The invention claimed is:

1. A gesture input device comprising:
   a movement detection unit that detects a user movement;
   an image projection unit that forms a zone image in space to present a region whereat the movement detection unit detects movement;
   a determination unit that assesses whether or not the movement detected by the movement detection unit is an input action representing a predetermined input; and
   an assessment result presentation unit that presents an assessment result from the determination unit, wherein
   the image projection unit comprises:
     a first light source; and
     a first light guide plate comprising a light emitting surface and that directs light entering from the first light source so that the light exits from the light emitting surface and forms the zone image in space,
   the assessment result presentation unit comprises:
     a plurality of second light sources; and
     a second light guide plate configured to direct light entering from the plurality of second light sources so that the light exits therefrom and forms an image in space, and
   when the movement detected by the movement detection unit is an input action representing a predetermined input, the assessment result presentation unit activates a second light source among the plurality of second light sources corresponding to said input action to cause a different image corresponding to the input action to be formed in space.

2. The gesture input device according to claim 1, wherein the second light guide plate and the first light guide plate are stacked.

3. The gesture input device according to claim 1, wherein the direction from which light is incident on the second light guide plate is different for the plurality of second light sources.

4. The gesture input device according to claim 1, wherein the direction from which light is incident on the second light guide plate is the same for the plurality of second light sources and the second light sources are mutually isolated.

* * * * *